(12) United States Patent
Crockett et al.

(10) Patent No.: US 7,103,166 B2
(45) Date of Patent: Sep. 5, 2006

(54) CALL TRANSFER SERVICE USING SERVICE CONTROL POINT AND SERVICE NODE

(75) Inventors: Susanne M. Crockett, Buffalo Grove, IL (US); Ronald King, deceased late of, American Canyon, CA (US); by Lorene King, legal representative, American Canyon, CA (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 10/401,556

(22) Filed: Mar. 31, 2003

(65) Prior Publication Data

US 2004/0190704 A1 Sep. 30, 2004

(51) Int. Cl.
*H04M 3/42* (2006.01)

(52) U.S. Cl. .............................. 379/211.02; 379/211.01; 379/212.01

(58) Field of Classification Search .............................. 379/265.01–266.1, 211.01, 211.02, 214.01, 379/264, 212.01, 213.01, 221.08, 221.09
See application file for complete search history.

(56) References Cited

U.S. PATENT DOCUMENTS

| 5,422,942 A * | 6/1995 | Kakwashima ........... 379/212.01 |
| 5,425,090 A | 6/1995 | Orriss |
| 5,469,504 A * | 11/1995 | Blaha ..................... 379/265.11 |
| 5,572,583 A | 11/1996 | Wheeler, Jr. et al. |
| 5,590,187 A * | 12/1996 | Greenspan ............. 379/212.01 |
| 5,646,985 A * | 7/1997 | Andruska et al. ........ 379/265.1 |
| 5,684,870 A * | 11/1997 | Maloney et al. ....... 379/212.01 |
| 5,694,463 A | 12/1997 | Christie et al. |
| 5,796,812 A * | 8/1998 | Hanlon et al. .......... 379/212.01 |
| 5,915,010 A * | 6/1999 | McCalmont ........... 379/212.01 |
| 5,920,618 A | 7/1999 | Fleischer, III et al. |
| 5,933,486 A | 8/1999 | Norby et al. |
| 5,946,387 A * | 8/1999 | Miloslavsky ........... 379/265.12 |
| 6,038,293 A * | 3/2000 | McNerney et al. ...... 379/88.19 |
| 6,064,667 A * | 5/2000 | Gisby et al. ................. 370/352 |
| 6,101,250 A | 8/2000 | Tiainen |
| 6,229,888 B1 * | 5/2001 | Miloslavsky ........... 379/265.01 |
| 6,246,757 B1 * | 6/2001 | Cai et al. .................. 379/114.2 |
| 6,320,952 B1 * | 11/2001 | Bruno et al. ........... 379/211.02 |
| 6,434,231 B1 | 8/2002 | Neyman et al. |
| 6,470,081 B1 | 10/2002 | Sbisa et al. |
| 6,618,600 B1 * | 9/2003 | Chow et al. ................. 455/567 |
| 6,853,718 B1 * | 2/2005 | Bedingfield et al. ... 379/212.01 |
| 2003/0223566 A1* | 12/2003 | Book et al. .................. 379/219 |

FOREIGN PATENT DOCUMENTS

| JP | 11-313515 | 11/1999 |
| JP | 2001-309411 | 11/2001 |
| WO | 00/41499 | 7/2000 |
| WO | 02/071768 | 9/2002 |

OTHER PUBLICATIONS

English Language Abstract of JP 11-313515.
English Language Abstract of JP 2001-309411.

* cited by examiner

*Primary Examiner*—Bing Q. Bui
(74) *Attorney, Agent, or Firm*—Greenblum & Bernstein, P.L.C.

(57) ABSTRACT

A call transfer service enables a call from a calling party to be transferred from a first agent to a second agent in response to a signal sent by the first agent. The call transfer service is implemented with a service node that offers call transfer service functionality, and a service control point providing menu routing. The service control point routes the call to the service node when it is determined that the call requires call transfer services. The service control point also forwards, via a data link, data associated with the call transfer service to the service node to facilitate transferring of the call.

19 Claims, 1 Drawing Sheet

CALL TRANSFER SERVICE USING SERVICE CONTROL POINT AND SERVICE NODE

BACKGROUND OF THE INVENTION

1. Field of the Invention

The present invention relates to the field of telecommunications. More particularly, the present invention relates to providing a call transfer service with a service control point and a service node.

2. Background Information

A call transfer service is a set of call transfer features and functions used by contact center agents to transfer or manipulate a call. The contact center agent initiates transfer requests by entering a pre-defined call transfer code (T-Code). The transfer features available to the contact center agent are based on the transfer features subscribed to by the business customer. Beside the ability to initiate a transfer request, the agent has the ability to initiate a number of function requests. A function request is an action that provides the agent with the ability to manipulate or control interaction with a caller. Call transfer service function requests control actions like, Place Caller On Hold With Silence; Place Caller On Hold With Music; Cancel A Transfer or Function Request. The agent initiates a function request by entering via dual tone multifrequency (DTMF) input a Function Code (F-Code). The F-Codes available to the contact center agent are dependent on the functions requested and subscribed to by the business customer. The call transfer service also supports a feature that allows a caller to initiate a particular transfer request.

One solution for implementing the call transfer service employs mid-call triggers to listen for agents entering attention keys. This solution is complicated. It is also expensive to implement the mid-call triggers on the switch.

Another solution is to route calls to a service node to process the call. However, because the service typically requires menu routing, menus have to be built on the service node, thus complicating provisioning. This solution is expensive from a network perspective and a service node port utilization perspective.

It would be desirable to have a solution that combines the benefits of a service control point (SCP) with the benefits of the service node. It would also be desirable to have a solution that only routes to the service node when the call is ready to be routed to an agent.

BRIEF DESCRIPTION OF THE DRAWINGS

The present invention is further described in the detailed description that follows, by reference to the noted drawing by way of non-limiting examples of embodiments of the present invention, in which.

DETAILED DESCRIPTION OF EMBODIMENTS

Figure 1:
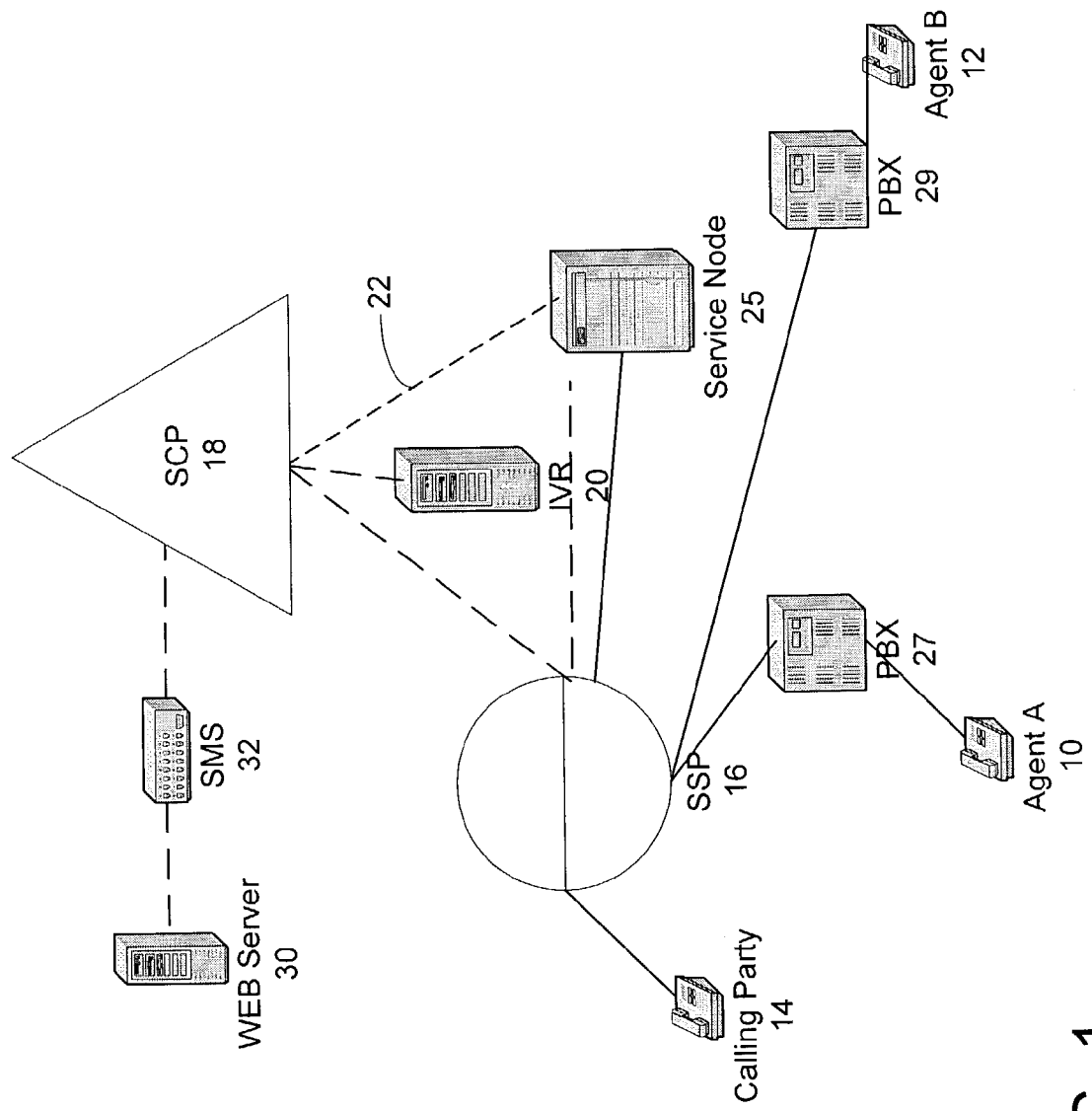
FIG. 1 is a block diagram showing an exemplary network architecture, according to an aspect of the present invention.

The present invention relates to an implementation of a call transfer service.

In view of the above, the present invention through one or more of its various aspects and/or embodiments is presented to accomplish one or more objectives and advantages, such as those noted below.

In an embodiment of the present invention a system is provided for implementing a call transfer service in which a call from a calling party is transferred from a first location to a second location in response to a signal from the first location. The system includes a service node with call transfer service functionality and a service control point. The service control point provides menu routing, and also routes the call to the service node when it is determined that the call requires call transfer services. In addition, the service control point forwards, via a data link, data associated with the call transfer service to the service node to facilitate routing of the call.

In one embodiment, the service node places an outbound call to the first location based on the routing digits and listens for the signal from the first location. The service node may receive the signal from the first location, the signal indicating that the call is to be transferred to the second location. In this case, the service node instructs a switch to place a new call to the second destination in response to receiving the signal.

The service node may return the call to menu routing in the service control point by placing another call to a number associated with the menu routing. The service node may receive an abbreviated signal from the agent and query the service control point to find routing information associated with the abbreviated signal. Subsequently, the service node routes the call to a destination based on the received routing information.

In another embodiment, a computer readable medium stores a program for implementing a call transfer service in which a call from a calling party is transferred from a first location to a second location in response to a signal from the first location. The medium includes a service node source code segment that provides call transfer service functionality. The medium also includes a service control point source code segment that provides menu routing, and routes the call to the service node when it is determined that the call requires call transfer services. The service control point source code segment also forwards, via a data link, data associated with the call transfer service to the service node to facilitate routing of the call.

In yet another embodiment, a method is provided for implementing a call transfer service in which a call from a calling party is transferred from a first location to a second location in response to a signal received from the first location. The method includes providing menu routing at a service control point, and routing the call to a service node when it is determined that the call requires call transfer services. The method also includes forwarding, via a data link, data associated with the call transfer service from the service control point to the service node to facilitate routing of the call.

The method may also include the step of instructing a service switching point to place an outbound call to the first location based on the routing digits received at the service node and the step of listening for the signal from the first location. The method may also include the steps of receiving the signal from the first location, the signal indicating that the call is to be transferred to the second location, and instructing a switch to place a new call to the second destination in response to receiving the signal.

The various aspects and embodiments of the present invention are described in detail below.

FIG. 1 is a block diagram depicting an exemplary network architecture in which the present invention operates. According to the present invention, a subscriber has subscribed to a call transfer service in which agents 10, 12, who process calls placed to the subscriber, have the ability to transfer the calls. An exemplary call will now be discussed.

A calling party 14 dials a toll free number associated with the subscriber. The call is suspended at the service switching point 16 and a query is launched to a service control point 18.

The service control point 18 analyzes the dialed number and determines that the call has been placed to the subscriber of the call transfer service. The service control point 18 then provides menu functionality for the subscriber in a known manner. For example, the subscriber may have instructed an announcement to be played to the caller 14 asking the caller 14 to press a number on the telephone in response to a query. In this example, the subscriber has provided an announcement that states "Please press 1 to speak to a representative in department A. Please press 2 to speak with a representative in department B." In this example, the subscriber has informed the service provider that representatives of department A will have the ability to transfer calls.

An intelligent peripheral (IP) unit 20 may be provided to play the announcements and collect digits from the caller. The IP 20 will operate in response to instructions from the service control point 18.

The service control point 18 may also provide screening functionality in a known manner. For example, the service control point 18 may provide origin dependent routing, which routes the call based upon the calling party number.

Once the service control point 18 has determined that the caller should be routed to an agent 10, the service control point 18 instructs the service switching point 16 to forward the call to a service node 25, using for example, AIN messaging, such as an Analyze Route message. An exemplary service node 25 is available from United States Advanced Networks, Inc. (USAN, Inc.). The service node 25 has been provisioned with call transfer service functionality in a known manner.

In addition, the service control point 18 forwards information associated with the call transfer service to the service node through a bi-directional data link 22. Exemplary data links include a GR-3511 link, a GDI link and an Internet connection. Of course other two way data links could also be used. The information that the service control point 18 forwards to the service node 25 includes routing digits, transfer codes (T-codes), function codes (F-codes), and an attention key.

Because the subscriber can define their own multiple digit T-Codes and F-Codes (1–4 digit in one embodiment), and define whether the * or # is the attention key, the set up of the call should include sending these definitions to the service node 25. Therefore, the initial setup includes the * or # ft key, followed by a number of pre-defined fields, fourteen in one embodiment. The fields correspond to codes known to the service node 25 and are up to four digits in length, in one embodiment.

The call transfer service can support on a per-subscriber basis a defined set of agent and caller T-Codes. Each call transfer feature must have its own unique code. Moreover, a T-Code must be preceded by the appropriate "Attention Key". Exemplary features that require a specific code are:

Call Transfer;
Menu Again (Unattended);
Menu Again (Attended);
Caller Transfer;
Warm Transfer Consult; and
Warm Transfer Conference.

The call transfer service should also support the following call transfer "Function" Codes:

Place caller on hold with silence;
Place caller on hold with music;
Reconnect caller on hold with silence or music;
Cancel a transfer or function request;
Disconnect the first agent in a consult/conference;
Disconnect the second agent in a consult/conference;
Disconnect all parties in a conference; and
Add caller to transfer consultation call (Consultation Becomes Conference Call).

In an example, the service control point 18 passes [*, 11, 12, 13, 14, 15, 16, 21, 22, 23, 24, 25, 26, 27, 28] along with the associated toll free number, which is used to invoke the service. The service node 25 then correlates the incoming call with the associated parameters and place an outbound call to the agent 10. If the agent 10 presses * and one of the assigned codes, the service node logic will perform the associated function or transfer.

In one embodiment, the service node 25 stores all of the information received from the service control point 18. In this embodiment, the service control point 18 only sends information, other than the toll free number, when the information has been updated by the subscriber. In another embodiment, the service node 25 temporarily stores the information, for example in a cache.

After the service node 25 has received the call, the service node 25 places a call to the agent 10 in a known manner. For example, the service node 25 opens an outbound port from the service node 25, via the service switching point 16, to a private branch exchange 27 and ultimately to the agent 10. The service node 25 then bridges the call from the outbound port to the inbound port on which the call arrived. Accordingly, the service node 25 is able to monitor the call from the calling party 14 to the agent 10.

While monitoring the call, the service node 25 listens for digits that indicate the call should be rerouted, i.e., transferred. In this example, the first agent 10 indicates that the call should be forwarded to the second agent 12 while the first agent 10 remains on the line and the calling party 14 is placed on hold. Thus, the service node 25 places the calling party 14 on hold and instructs the service switching point 16 to originate a new call to the private branch exchange 29 and ultimately to the second agent 12. The service node 25 then bridges the agents 10, 12.

In the case when the call is transferred and the first agent 10 drops out, e.g., a blind transfer, the service node 25 removes itself from the call using, e.g., release link trunking, or the like. In another embodiment, the subscriber can permit the agent to make multiple transfers. In this case, the service node 25 remains on the line after the transfer to the second agent and monitors for input from the second agent. If the second agent requires a transfer, the process starts over.

In one embodiment of the present invention, the subscriber can provision the call transfer service via a web server 30. In this case, the subscriber connects to the web server 30, which interacts with the service control point 18 via an SMS 32. In an exemplary configuration, the subscriber assigns DTMF digits to the various function codes.

In another embodiment, an agent 10 is provided with the ability to enter an abbreviated extension code, instead of a full ten digit number, to transfer a call. If the transfer feature allows for extension codes to be entered, the agent 10 may be prompted to enter an extension number. In this embodiment, the service node 25 that has been monitoring the call will collect the digits and query the service control point 18 for ten digit mapping of the extension. In one embodiment, the query includes the toll free number plus the 1–4 digit extension number entered. The query is sent over the bi-directional data link 22. The service control point 18 then looks in a database associated with the subscriber for the full ten digit number corresponding with the abbreviated extension code. The service control point 18 returns the ten digit routable number or a terminating Switch ID and Trunk Group in a corresponding message. The call is then transferred from the service node 25 to the ten digit number.

In yet another embodiment, the calling party 14 is provided with the ability to be returned to the menu. In this case, the agent 10 provides a signal to the service node 25 indicating the desired return. Upon receiving the signal, the service node 25 places a call to a number that will lead into the menuing, e.g., the toll free number that the calling party 14 originally had dialed. Consequently, the call returns to the service control point menuing.

Thus, according to an aspect of the present invention a service node 25 and a service control point 18 together provide a call transfer service. A link 22 is provided between the components 18, 25 to enable communication between the components to facilitate provision of the service.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium, e.g., a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards (e.g., GR-3511 and GDI) represent examples of the state of the art. Such standards are periodically superseded by faster or more efficient equivalents having essentially the same functions. Accordingly, replacement standards and protocols having the same functions are considered equivalents.

What is claimed is:

1. A system for implementing a call transfer service in which a call from a calling party is transferred from a first agent at a first location to a second agent at a second location in response to a signal from the first location, the system comprising:
    a service node comprising call transfer service functionality; and
    a service control point providing menu routing, the service control point routing the call to the service node when it is determined that the call has been placed to a subscriber of the call transfer service, the service control point also forwarding, via a data link, subscriber defined call transfer feature codes to the service node.

2. The system of claim 1, in which the subscriber defined call transfer feature codes comprise at least one of a transfer code, a function code and an attention key.

3. The system of claim 2, in which the service node places an outbound call to the first location based on routing digits.

4. The system of claim 2, in which the service node listens for the signal from the first location.

5. The system of claim 4, in which the service node receives the signal from the first location, the signal indicating that the call is to be transferred to the second location, the service node instructing a switch to place a new call to the second destination in response to receiving the signal.

6. The system of claim 1, in which the service node releases the call.

7. The system of claim 1, further comprising a web interface to the service control point, a subscriber using the web interface to provision the service control point with call transfer service preferences.

8. The system of claim 1, in which the service node returns the call to menu routing in the service control point by placing another call to a number associated with the menu routing.

9. The system of claim 1, in which the service node receives an abbreviated signal from the first agent, the service node querying the service control point to find routing information associated with the abbreviated signal and routing the call to the second agent based on the received routing information.

10. A computer readable medium storing a program for implementing a call transfer service in which a call from a calling party is transferred from a first agent at a first location to a second agent at a second location in response to a signal received from the first location, the medium comprising:
    a service node code segment that provides call transfer service functionality; and
    a service control point code segment that provides menu routing, the service control point code segment routing the call to the service node when it is determined that the call has been placed to a subscriber of the call transfer service, the service control point code segment also forwarding, via a data link, subscriber defined call transfer feature codes to the service node.

11. A method for implementing a call transfer service in which a call from a calling party is transferred from a first agent at a first location to a second agent at a second location in response to a signal received from the first location, the method comprising:

provide menu routing at a service control point;

routing the call to a service node when it is determined that the call has been placed to a subscriber of the call transfer service;

forwarding, via a data link, subscriber defined call transfer feature codes from the service control point to the service node to facilitate routing of the call.

12. The method of claim 11, in which the subscriber defined call transfer feature codes comprise at least one of a transfer code, a function code and an attention key.

13. The method of claim 12, further comprising instructing a service switching point to place an outbound call to the first location based on routing digits received at the service node.

14. The method of claim 12, further comprising the service node listening for the signal from the first location.

15. The method of claim 14, further comprising the service node receiving the signal from the first location, the signal indicating that the call is to be transferred to the second location; and the service node instructing a switch to place a new call to the second destination in response to receiving the signal.

16. The method of claim 11, further comprising the service node releasing the call.

17. The method of claim 11, further comprising provisioning the service control point with call transfer service preferences using a web interface to the service control point.

18. The method of claim 11, further comprising the service node returning the call to menu routing in the service control point by placing another call to a number associated with the menu routing.

19. The method of claim 11, further comprising receiving at the service node an abbreviated signal from the first agent;

querying from the service node to the service control point to find routing information associated with the abbreviated signal; and routing the call to the second agent based on the received routing information.

* * * * *